(12) United States Patent
Yoo et al.

(10) Patent No.: US 8,515,124 B2
(45) Date of Patent: Aug. 20, 2013

(54) METHOD AND APPARATUS FOR DETERMINING FAKE IMAGE

(75) Inventors: Jang-Hee Yoo, Daejeon (KR);
Younghwan Kim, Jeollanam-do (KR);
Kyoungho Choi, Jeollanam-do (KR);
Soonyoung Park, Jeollanam-do (KR);
Ki Young Moon, Daejeon (KR)

(73) Assignees: Electronics and Telecommunications Research Institute, Daejeon (KR);
Mokpo National University Industry-Academic Cooperation Foundation, Jeollanam-do (KR)

( * ) Notice: Subject to any disclaimer, the term of this patent is extended or adjusted under 35 U.S.C. 154(b) by 310 days.

(21) Appl. No.: 13/017,651

(22) Filed: Jan. 31, 2011

(65) Prior Publication Data

US 2011/0188712 A1    Aug. 4, 2011

(30) Foreign Application Priority Data

Feb. 4, 2010  (KR) .................. 10-2010-0010644
Jun. 1, 2010  (KR) .................. 10-2010-0051996

(51) Int. Cl.
*G06K 9/00* (2006.01)

(52) U.S. Cl.
USPC ........... 382/100; 382/118; 382/124; 382/127; 382/159; 382/190; 382/225; 382/170; 382/226; 382/227; 382/245; 382/295; 382/224

(58) Field of Classification Search
CPC .............. H04N 2201/3233; H04N 1/32229
USPC ............. 382/100, 118, 124, 127, 159, 190, 382/225, 170, 226, 227, 245, 286, 224
See application file for complete search history.

(56) References Cited

U.S. PATENT DOCUMENTS

| 4,951,140 A * | 8/1990 | Ueno et al. ............... 348/413.1 |
| 7,082,209 B2 | 7/2006 | Ito et al. |
| 2004/0052415 A1 * | 3/2004 | Kondo et al. ............ 382/173 |

FOREIGN PATENT DOCUMENTS

| JP | 2005-284652 | 10/2005 |
| KR | 1020040048753 | 6/2004 |
| KR | 1020060100341 | 9/2006 |
| KR | 1020070022446 | 2/2007 |
| KR | 1020080037447 | 4/2008 |
| KR | 1020090097613 | 9/2009 |

OTHER PUBLICATIONS

Kim, Youngwhan et al., "A Background Analysis Technique for Video Liveness Detection," 16th Korea-Japan Joint Workshop on Frontiers of Computer Vision (2010).

* cited by examiner

*Primary Examiner* — Mike Rahmjoo
(74) *Attorney, Agent, or Firm* — Nelson Mullins Riley & Scarborough LLP

(57) ABSTRACT

An apparatus for determining a fake image includes an image-acquiring block for acquiring an image captured by and input from a camera; and a background-learning block for learning a background of the image to create a learning background. Further, the apparatus for determining the fake image includes a face extracting-block for extracting a face region of a person to be authenticated when an input image for authentication is transmitted from the camera; and an inter-background comparing block for comparing a present background of an input image with the learning background. Furthermore, the apparatus for determining the fake image includes a motion information-comparing block for extracting motion information in the face region and the present background to compare the same with each other; and a fake image-determining block for determining whether the input image is faked using the compared results of the motion information and the backgrounds.

20 Claims, 3 Drawing Sheets

METHOD AND APPARATUS FOR DETERMINING FAKE IMAGE

CROSS-REFERENCE TO RELATED APPLICATION(S)

The present invention claims priority of Korean Patent Application No. 10-2010-0010644, filed on Feb. 4, 2010, and Korean Patent Application No. 10-2010-0051996, filed on Jun. 1, 2010, which are incorporated herein by references.

FIELD OF THE INVENTION

The present invention relates to a technology of determining a fake image; and more particularly to, a method and an apparatus for determining a fake image to prevent fake recognition (authentication) using a photograph or a moving picture by combining a facial information and a background information in a face recognition system using image information that is continuously input.

BACKGROUND OF THE INVENTION

In general, a security system for restricting access chiefly uses recognition of face, fingerprints, iris, and voice and adopts a double security system or a triple security system, because there would be a fake recognition.

The biometric technology based on personal physical and behavioral features such as face, iris, fingerprints, vein, voice, signature, and gait uses information about personal physical and behavioral features. Therefore, there is neither worry about loss of the information nor need to memorize the information, whereas malicious imitation (fake) can be done.

In a conventional face recognition system, a separated device for preventing an image to be authenticated (recognized) from being faked, that is, an infrared camera or a thermal infrared camera, specifically a vein map of the infrared camera or thermal distribution on a face shot with the thermal infrared camera is used to solve the above-mentioned problems.

However, the conventional face recognition system using the vein map in an image for authentication (recognition) captured by the infrared camera or the thermal distribution of face captured by the thermal infrared camera becomes complicated because the device such as the infrared camera or the thermal infrared camera needs to be added. As a result, cost of total system increases so that there is a limit of popularization (various applications).

Moreover, recognition performance and technical difficulty of determining whether an object to be recognized is a photograph or a moving picture disturb the conventional face recognition system to be widely employed.

SUMMARY OF THE INVENTION

In view of the above, the present invention provides a method and an apparatus for determining a fake image, which is capable of separating an input image for authentication that is created through background-learning into a background region and a moving object region. Further, the present invention provides a method and an apparatus for determining a fake image, which is capable of determining whether the input image is a real image or a fake image using motion information about the separated moving object region and the separated background region.

In accordance with a first aspect of the present invention, there is provided an apparatus for determining a fake image. The apparatus for determining a fake image includes an image-acquiring block for acquiring an image captured by and input from a camera; and a background-learning block for learning a background of the image to create a learning background. Further, the apparatus for determining the fake image includes a face extracting-block for extracting a face region of a person to be authenticated when an input image for authentication is transmitted from the camera; and an inter-background comparing block for comparing a present background of an input image from which the face region is removed with the learning background. Furthermore, the apparatus for determining the fake image includes a motion information-comparing block for extracting motion information in the face region and the present background to compare the same with each other; and a fake image-determining block for determining whether the input image is faked using the compared results of the motion information and the backgrounds.

In accordance with a second aspect of the present invention, there is provided a method for determining a fake image. The method for determining the fake image includes creating a reference background; and separating an input image into a present background and a moving object of a present frame when the moving object is detected from the input image captured by a camera. Further, the method for determining the fake image includes determining whether the reference background is matched to the present background; and calculating vector components of the moving object and the present background to compare the calculated vector components with each other. Furthermore, the method for determining the fake image includes calculating a liveness index using the compared results of checking whether the reference background is matched to the present background and of the motion vector components; and determining whether the input image is faked using the calculated liveness index.

In accordance with an embodiment of the present invention, the input image for authentication created by the background learning is separated into the background region and the moving object region. The compared results of the learning background obtained through the background learning with the separated background region and the motion information of the separated moving object and the background region are used to determine whether the input image is faked. Here, the motion information may mean information about motion vectors of feature points within the separated moving object and background regions. Consequently, it is possible to realize a simple and cheap face recognition system that is easily applicable to a conventional system.

Moreover, since the present invention is applicable to the conventional face recognition system by adding a relatively small device, it is possible to remarkably improve reliability and security of the face recognition system and possible to invigorate the field of the face recognition industry by applying the present invention to various applications.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
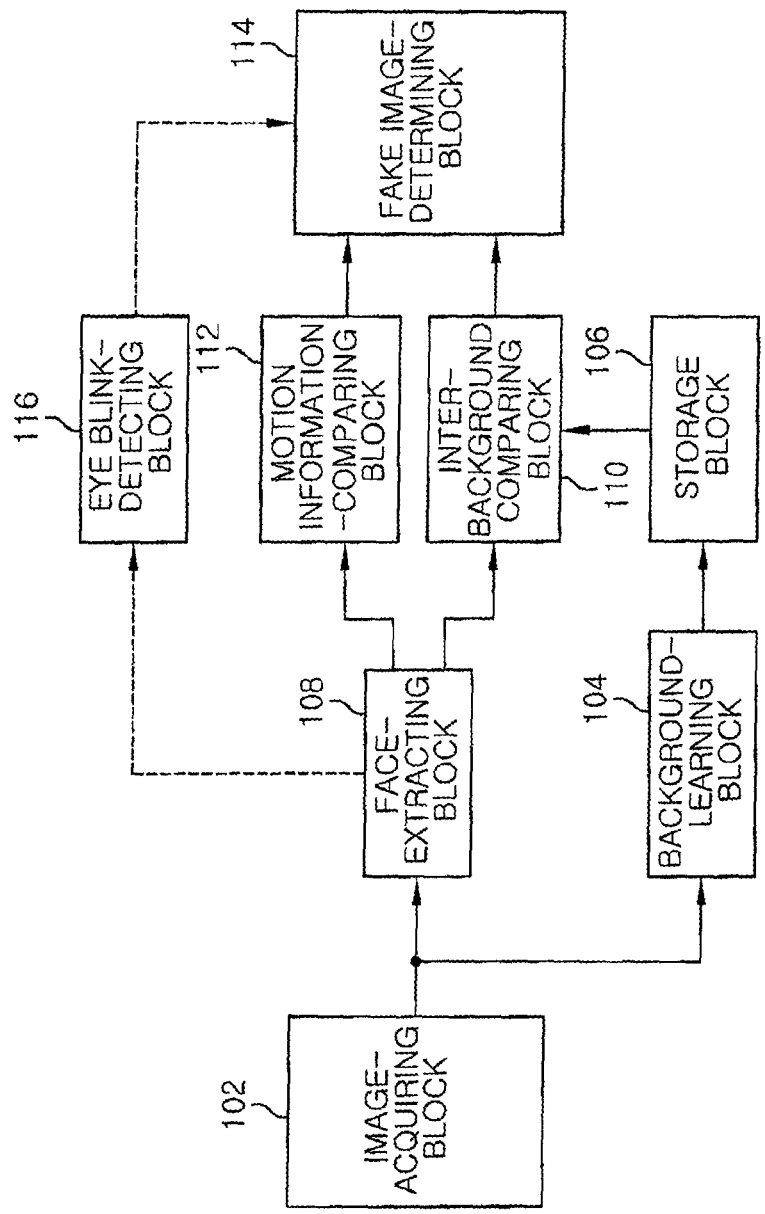
FIG. 1 is a block diagram illustrating an apparatus for determining a fake image in accordance with an embodiment of the present invention.

FIG. 1 is a block diagram illustrating an apparatus for determining a fake image in accordance with an embodiment of the present invention. The apparatus for determining the fake image includes an image-acquiring block 102, a background-learning block 104, a storage block 106, a face-extracting block 108, an inter-background comparing block 110, a motion information-comparing block 112, and a fake image-determining block 114, and may include a eye blink detecting block 116.

Referring to FIG. 1, the image-acquiring block 102 includes, e.g., a CCD camera or a USB camera and acquires an input image captured by a camera to transmit the acquired input image to the background-learning block 104 and the face-extracting block 108, respectively. Here, the input image may be an image for authentication including a face of a person to be authenticated (or a moving object) or a general image without the face of the person to be authenticated.

The background-learning block 104 performs the background-learning by modeling averages and optical distributions of respective pixels with K Gaussian mixture models with respect to a present background among a plurality of backgrounds (input images) input from the image-acquiring block 102 for a preset time to create K models. Further, the background-learning block 104 selects a background of a model having a relatively heaviest weight among the created K models as a learning background (or a reference background) to store the selected learning background in the storage block 106.

That is, the background-learning block 104 estimates an average background up to a present frame with the highest probability and continuously creates a background model having the highest probability until now to update the learning background.

The face-extracting block 108 determines whether there is a face region (moving object) in an input image provided from the image-acquiring block 102 using a face detector. e.g., Viola-Jones Face detector Then, when it is determined that the face region (moving object) exists as the detection, the face-extracting block 108 separates the input image into the face region (moving object) and a present background (a present background region excluding the face region) using masking technique or the like. In this case, the present background is transmitted to the inter-background comparing block 110, the input image made of the face region and the present background is transmitted to the motion information-comparing block 112, and the face region may be selectively transmitted to the eye blink-detecting block 116.

The inter-background comparing block 110 compares the present background transmitted from the face-extracting block 108 with the learning background stored in the storage block 106 to determine a background similarity. The comparison of backgrounds may be performed using Structural similarity Index Measure (SSIM) or Mean Square Error (MSE) and the background similarity (e.g., SSIM value) obtained by comparing the backgrounds is transmitted to the fake image-determining block 114.

In general, in a real image that is not faked, the background region excluding a face is identical to the background region (learning background region) that is early stored so that SSIM has a value almost the same as Therefore, when a fake image is input, the background information (background region) becomes different and SSIM is decreased so that the fake image can be determined.

Further, the motion information-comparing block 112 extracts (calculates) motion vector components (motion information) of the face region and the motion vector components in the present background to compare the extracted motion vector components. In order to analyze the motion information, e.g., an optical flow-measuring technique or a Lukas-Kanade algorithm may be used. Here, the calculated values of vector components of the optical flow become an average value of optical flow vectors of the present background regions excluding vector components of the face regions based on the face. Further, a background motion index (BMI) is calculated by the following equation 1 using the average value of optical flow vectors and is transmitted to the fake image-determining block 114.

$$BMI = 1 - (Motion_{cur}/Motion_{max}) \quad \text{[Equation 1]}$$

That is, the motion information-comparing block 112 extracts feature points from a t-th frame and a (t−1)th frame at the present time, calculates motion vector components between the extracted feature points, and determines whether the calculated motion vector components are motion vector components of the present background or the moving object (face region). Then, the motion information-comparing block 112 normalizes the motion vector components (Motion$_{cur}$) determined based on maximum motion vector components (Motion$_{max}$) to calculate the BMI.

In general, the BMI is decreased when there is a motion. Therefore, when a still photograph or a display image on an LCD or the like is input to a camera instead of a person, a region determined as a background is moved due to hand trembling and the BMI varies due to the motion of the still photograph or the display image on the LCD. Further, SSIM is remarkably dropped than the normal input, i.e., a case when the person is input.

The fake image-determining block 114 calculates a liveness index as the following equation 2 by summing a background similarity (compared result of a background: SSIM) transmitted from the inter-background comparing block 110 and BMI (a compared result of the motion information) provided from the motion information-comparing block 112. In following equation 2, α and β indicate levels of the two values (SSIM and BMI), respectively.

$$\text{Liveness Index} = \alpha \cdot SSIM + \beta \cdot BMI \quad \text{[Equation 2]}$$

The fake image-determining block 114 determines a corresponding input image as a fake image when the calculated liveness index is greater than a preset threshold and as a real image when the calculated liveness index is equal to or less than the preset threshold. That is, the fake image-determining block 114 determines whether the input image is faked by analyzing variations of the SSIM and BMI that would occur when the input image is faked.

Further, the fake image-determining apparatus in accordance with an embodiment of the present invention further includes a eye blink-detecting block 116. The eye blink-detecting block 116 detects blink of eyes from the face region transmitted from the face-extracting block 108 and transmits the detected result to the fake image-determining block 114.

The fake image-determining block 114 determines a corresponding input image as a real image when the calculated liveness index is less than the preset threshold and the blink of eyes is detected. That is, the fake image-determining block 114 determines the corresponding input image as a fake image when the calculated liveness index is less than the preset threshold but the blink of eyes is not detected.

In accordance with the embodiment of the present invention, the learning background as a comparing object with the present background in the present frame is automatically created by the background learning using Gaussian mixture model. However, the present invention is not limited thereto and may be to select a background image assigned (selected) by a user as the learning background.

Next, a method for determining a fake image by combining face with background information using the fake image-determining apparatus as described above will be described in detail.

Figure 2:
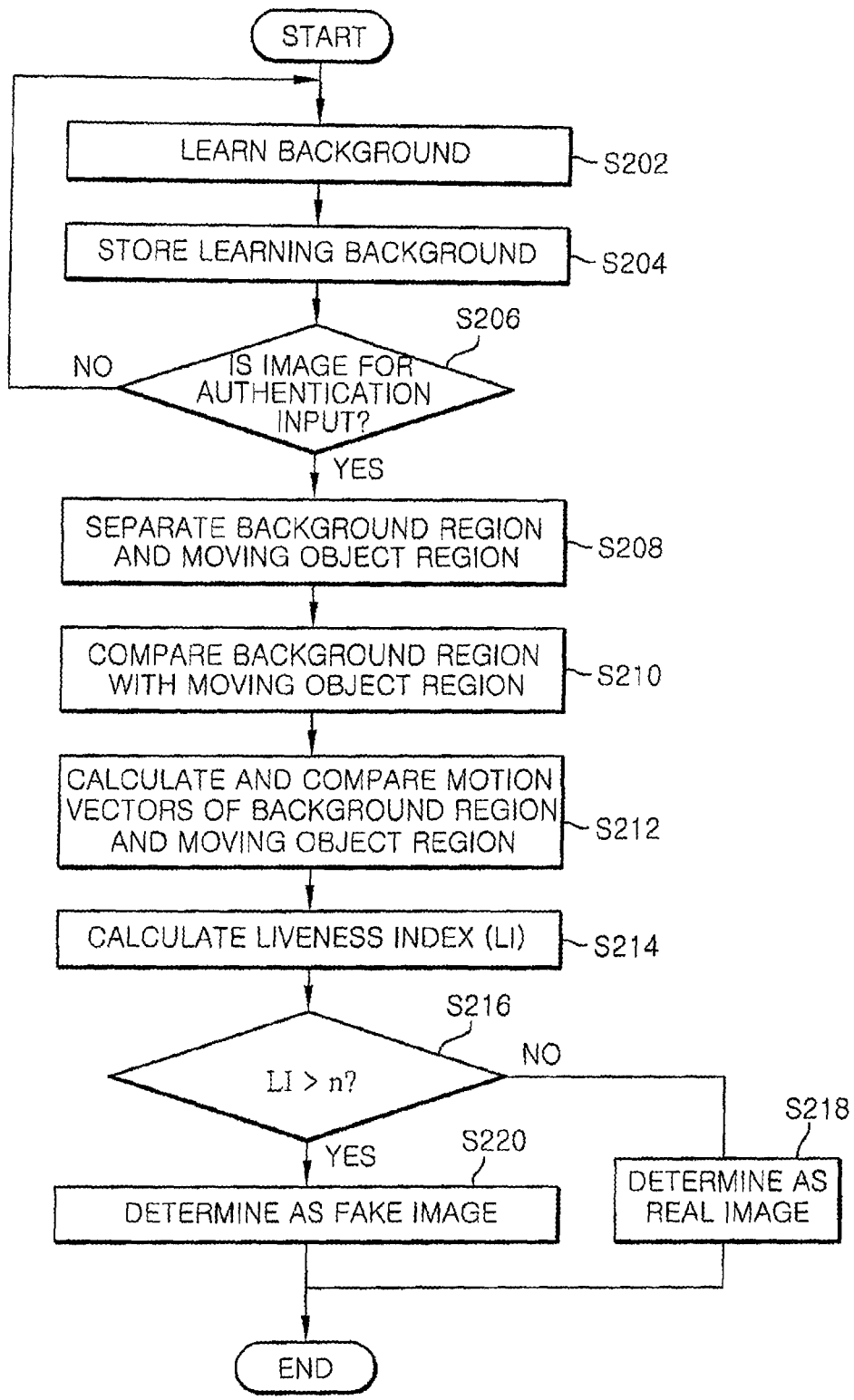
FIG. 2 is a flow chart illustrating a process of determining a fake image by combining face with background in accordance with the embodiment of the present invention.

FIG. 2 is a flow chart illustrating a method for determining a fake image by combining face with background in accordance with the embodiment of the present invention.

Referring to FIG. 2, when a system is set, the background-learning block 104 performs the background-learning by modeling averages and optical distributions of respective pixels with K Gaussian mixture models with respect to a present background among a plurality of backgrounds (input images) input from the image-acquiring block 102 for a preset time to create K models in step S202. Then, the background-learning block 104 selects a background of a model having a relatively heaviest weight among the created K models as a learning background (or a reference background) to store the selected learning background in the storage block 106 in step S204.

Here, the reference background is estimated as an average background up to a present frame with the highest probability and may be updated by continuously creating a background model having the highest probability until now.

The face-extracting block 108 determines whether there is a face region (moving object) in an input image provided from the image-acquiring block 102 using a face detector (e.g., Viola-Jones Face detector) and checks whether an image for authentication (input image including face information of a subject person) is input in step S206. In this embodiment of the present invention, Viola-Jones face detector is used as a face detector. However, the present invention is not limited thereto and may select a face detect assigned (selected) by a user.

When the input image is an image for authentication as the results of the check in step S206, the face-extracting block 108 separates the input image into a face region (moving object) and a present background (a present background region excluding the face region) using masking technique in step S208. Then, the face-extracting block 108 provides the separated present background to the inter-background comparing block 110, and provides the input image including the face region and the present background to the motion information-comparing block 112. In this case, the separated moving object may be provided to the eye blink-detecting block 116.

The inter-background comparing block 110 compares the present background with the learning background stored in the storage block 106 to determine a background similarity, i.e., determine the background similarity (e.g., SSIM value) using SSIM or MSE in step S210 and transmits the determined background similarity to the fake image-determining block 114.

The motion information-comparing block 112 extracts (calculates) motion vector components (motion information) in the face region and the motion vector components in the present background using the optical flow-measuring technique to compare the extracted motion vector components with each other in step S212 to calculate BMI (motion information). The calculate BMI values are transmitted to the fake image-determining block 114. The process of calculating the BMI values will be described with reference to FIG. 3 in detail.

Figure 3:
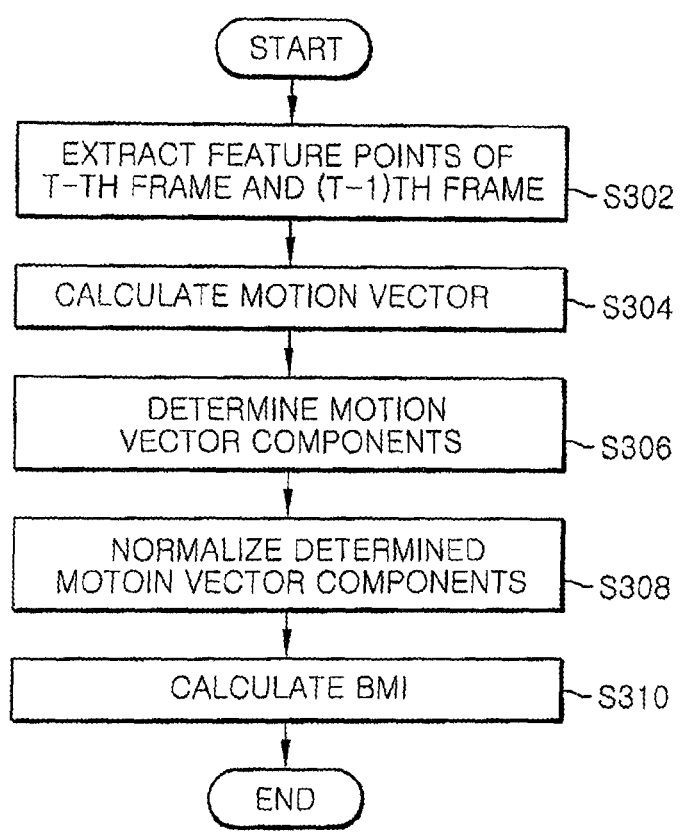
FIG. 3 is a flow chart illustrating a process of calculating BMI based on motion vector components of a region of a moved object and a region of a present background in accordance with the embodiment of the present invention.

FIG. 3 is a flow chart illustrating a method for calculating BMI based on motion vector components of a region of a moved object and a region of a present background in accordance with an embodiment of the present invention.

Referring to FIG. 3, the motion information-comparing block 112 extracts feature points from a t-th frame and a (t−1)th frame at the present time in step S302 and calculates motion vector components between the extracted feature points in step S304.

Next, the motion information-comparing block 112 determines whether the calculated motion vector components are motion vector components of the present background or the moving object (face region) in step S306.

Thereafter, the motion information-comparing block 112 normalizes the motion vector components determined based on maximum motion vector components in step S308 to calculate BMI (motion information) with respect to the corresponding input image in step S310. The calculated BMI values are transmitted to the fake image-determining block 114.

Referring back to FIG. 2, the fake image-determining block 114 calculates a liveness index (LI) using a background similarity (compared result of a background) transmitted from the inter-background comparing block 110 and BMI value (a compared result of the motion information) provided from the motion information-comparing block 112 in step S214.

Next, the fake image-determining block 114 determines whether the input image is faked by comparing the calculated LI with a preset threshold n in step S216. That is, the fake image-determining block 114 determines the input image as a real image (a normal image for authentication) when the LI is equal to or less than the preset threshold n in step S218 and as a fake image when the LI is greater than the preset threshold n in step S220.

Further, blink of eyes in the face region of the subject person may be additionally detected and used in determining whether the input image is faked. That is, the fake image-determining block 114 determines a corresponding input image as a real image when the calculated LI is equal to or less than the preset threshold n and the blink of eyes is detected. On the other hand, the fake image-determining block 114 determines the corresponding input image as a fake image when the calculated LI is equal to or less than the preset threshold n but the blink of the eyes is not detected.

While the invention has been shown and described with respect to the embodiments, it will be understood by those skilled in the art that various changes and modifications may be made without departing from the scope of the invention as defined in the following claims.

What is claimed is:

1. An apparatus for determining a fake image, comprising:
an image-acquiring block for acquiring an image captured by and input from a camera;
a background-learning block for learning a background of the image to create a learning background;
a face extracting-block for extracting a face region of a person to be authenticated when an input image for authentication is transmitted from the camera;

an inter-background comparing block for comparing a present background of an input image from which the face region is removed with the learning background;
a motion information-comparing block for extracting motion information in the face region and the present background to compare the same with each other; and
a fake image-determining block for determining whether the input image is faked using the compared results of the motion information and the backgrounds.

2. The apparatus of claim 1, wherein the background-learning block creates the learning background through the background-learning of calculating averages and optical distributions of respective pixels with respect to a plurality of backgrounds input from the camera for a preset time and of modeling the calculated averages and optical distributions with Gaussian mixture models.

3. The apparatus of claim 2, wherein the background-learning block selects a background of a model having a relatively heaviest weight among the models created by the modeling as the learning background.

4. The apparatus of claim 1, wherein the inter-background comparing block compares the present background with the learning background using Structural similarity Index Measure (SSIM) or Mean Square Error (MSE).

5. The apparatus of claim 1, wherein the motion information-comparing block compares a motion vector component of the face region with a motion vector component of the present background.

6. The apparatus of claim 5, wherein the motion information-comparing block calculates a background motion index (BMI) by the following equation, $$BMI=1-(Motion_{cur}/Motion_{max}).$$

7. The apparatus of claim 1, wherein the fake image-determining block calculates a liveness index using compared results of the motion information and the backgrounds to determine whether the input image is faked based on the calculated liveness index.

8. The apparatus of claim 7, wherein the fake image-determining block calculates the liveness index by the following equation, $$\text{Liveness Index}=\alpha \cdot SSIM+\beta \cdot BMI$$

where the SSIM is structural similarity index measure, the BMI is background motion index, and $\alpha$ and $\beta$ indicate levels of reflection.

9. The apparatus of claim 8, wherein the fake image-determining block determines the input image as a fake image when the calculated liveness index is greater than a preset threshold.

10. The apparatus of claim 1, further comprising a eye blink-detecting block for detecting blink of eyes from the face region,
wherein the fake image-determining block finally determines whether the input image is faked using the compared results of the motion information and the backgrounds when the blink of eyes is not detected.

11. A method for determining a fake image, comprising:
creating a reference background;
separating an input image into a present background and a moving object of a present frame when the moving object is detected from the input image captured by a camera;
determining whether the reference background is matched to the present background;
calculating vector components of the moving object and the present background to compare the calculated vector components with each other;
calculating a liveness index using the compared results of checking whether the reference background is matched to the present background and of the motion vector components; and
determining whether the input image is faked using the calculated liveness index.

12. The method of claim 11, wherein the reference background is created through a background-learning of calculating averages and optical distributions of respective pixels with respect to a plurality of backgrounds input from the camera for a preset time and of modeling the calculates averages and optical distributions with Gaussian mixture models.

13. The method of claim 12, wherein a background of a model having a relatively heaviest weight among the models created by the modeling is selected as the reference background.

14. The method of claim 11, wherein the reference background is selected by a user.

15. The method of claim 11, wherein said determining whether the reference background is matched to the present background is performed using Structural similarity Index Measure (SSIM).

16. The method of claim 11, wherein said determining whether the reference background is matched to the present background is performed using Mean Square Error (MSE).

17. The method of claim 16, wherein said calculating vector components of the moving object and the present background to compare the calculated vector components with each other includes;
extracting feature points from a t-th frame and a (t−1)th frame at the present time;
calculating motion vector components between the extracted feature points;
determining whether the calculated motion vector components are motion vector components of the present background or of the moving object;
normalizing the motion vector components determined based on a maximum motion vector component; and
calculating a background motion index (BMI) based on the normalized motion vector components.

18. The method of claim 17, wherein the liveness index is calculated by summing a structural similarity index measure (SSIM) value and a value of the BMI based on levels of reflection $\alpha$ and $\beta$ of the values,
wherein $\alpha$ and $\beta$ indicate levels of reflection.

19. The method of claim 18, wherein the input image is determined as a fake image when the calculated liveness index is greater than a preset threshold.

20. The method of claim 19, further comprises detecting a blink of eyes from the face region of the separated moving object,
wherein whether the input image is faked is determined based on the calculated liveness index when the blink of eyes is not detected.

* * * * *